United States Patent [19]

Poler

[11] Patent Number: 4,571,040

[45] Date of Patent: * Feb. 18, 1986

[54] CONTACT LENS AND HAPTIC

[75] Inventor: Stanley Poler, New York, N.Y.

[73] Assignee: Lynell Medical Technology, Inc., Monrovia, Calif.

[*] Notice: The portion of the term of this patent subsequent to Mar. 22, 2000 has been disclaimed.

[21] Appl. No.: 467,436

[22] Filed: Feb. 17, 1983

Related U.S. Application Data

[63] Continuation-in-part of Ser. No. 124,941, Feb. 26, 1980, Pat. No. 4,377,329.

[51] Int. Cl.$^4$ ................................................ G02C 7/04
[52] U.S. Cl. ................................................ 351/160 R
[58] Field of Search ............... 3/13, 13 A; 351/160 R, 351/160 H, 161, 159

[56] References Cited

U.S. PATENT DOCUMENTS 4,126,904  11/1978  Shepard ........................ 351/160 R
4,377,329   3/1983  Poler ............................. 351/160 R

*Primary Examiner*—John K. Corbin
*Assistant Examiner*—Scott J. Sugarman
*Attorney, Agent, or Firm*—Hopgood, Calimafde, Kalil, Blaustein & Judlowe

[57] ABSTRACT

The invention contemplates a combined contact lens and haptic wherein the outer edge of the haptic has peripherally continuous integrity and wherein the haptic is so axially compliant that it is self-adapting to the curvature of the cornea to which it is applied. The construction is such as to be self-cleansing in conjunction with natural moisture on the surface of the cornea, and to be inherently non-promoting of enzyme development on the cornea.

22 Claims, 8 Drawing Figures

CONTACT LENS AND HAPTIC

RELATED CASE

This application is a continuation-in-part of my copending application, Ser. No. 124,941, filed Feb. 26, 1980, now U.S. Pat. No. 4,377,329.

BACKGROUND OF THE INVENTION

The invention relates to lens structures for removable contact application to the cornea, for wear in place of spectacles, and in particular to the variety of contact lens which is small and centrally retained by surrounding haptic structure.

Lens and haptic configurations for contact application to the cornea are illustratively disclosed in my copending application Ser. Nos. 124,941, 225,349, filed Jan. 15, 1981, now U.S. Pat No. 4,435,050, among others. In general, it may be said of such structures that the lens component is relatively small but consistent with optical requirements of the eye under all conditions of illumination, and that the supporting haptic component which retains and surrounds the lens component is characterized by plural radially outward foot formations which are so axially flexible as to conform to the curvature of the cornea, adhering to the cornea by reason of fluid at the surface of the cornea. Substantial fenestration characterizes the foot formations, to the end that corneal fluid may not be trapped, so that enzyme build-up and the need for frequent removal may be minimized.

In spite of advantages from use of such contact lens-and-haptic constructions, the fact remains that the disclosed embodiments of said applications are relatively non-compliant in the radial direction, and this presents a limitation on the fidelity of self-conforming adaptability of the haptic to the curvature of the cornea.

BRIEF STATEMENT OF THE INVENTION

It is an object of the invention to provide improved contact lens and haptic structure of the character indicated.

It is a specific object to provide improved structure of the character indicated wherein the periphery of the haptic is essentially circumferentially continuous and wherein utmost axial and radial flexibility is provided for ready self-conformance and adherence to the curvature of the cornea.

It is also a specific object to meet the above objects with haptic configurations adapted to definition from flat sheet material, without requiring permanent deformation from the initial flatness of the sheet material.

Another specific object is to achieve the above objects with structure which can promote circulation of fluid on the surface of the cornea, merely as a result of natural blinking of the eye.

A further specific object is to provide improved haptic configurations permitting the optional employment of optical glass or plastic as the material of the lens element.

Another object is to provide a construction of the character indicated and inherently capable of supplying astigmatism correction for the wearer.

A general object is to meet the above objects with relatively simple structure which lends itself to quantity and precision manufacture, which inherently provides comfort and safety to the wearer, which involves substantially reduced demands for removal, cleaning and replacement, and which can be cleaned and sterilized by boiling in water or by autoclaving.

The foregoing and other objects and features of the invention are achieved in contact-lens constructions (a) wherein the lens element is of substantially reduced diameter (e.g., 5 to 8 mm) and is thus essentially only of the size required to serve a fully dilated pupil, (b) wherein fenestrated compliant haptic structure is peripherally connected to the lens element and adheres to the wet surface of the cornea for stabilized support of the lens element, and (c) wherein the periphery of the haptic is essentially circumferentially continuous and is connected to the lens element by structure which is both radially and axially compliant.

DETAILED DESCRIPTION

The invention will be illustratively described in conjunction with the accompanying drawings, in which.

Figure 1:
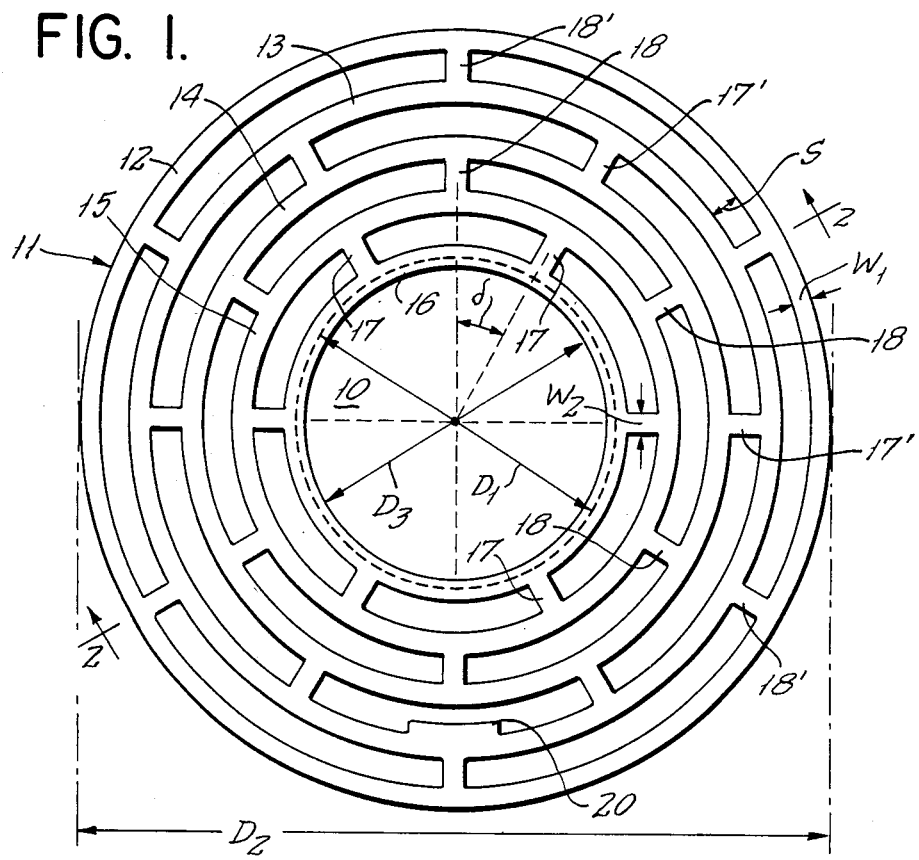
FIG. 1 is an enlarged front-elevation view of lens and haptic structure of the invention.

In FIG. 1, the invention is shown in application to a contact-lens assembly comprising a central lens element 10, which may be of molded plastic or deformed from plastic sheet material, or which may be of optically finished glass, ground to prescription curvature (e.g., plano-convex or meniscus), and of outside diameter $D_1$ which equals or slightly exceeds the diameter of the fully dilated pupil of a human eye. Generally speaking, the diameter $D_1$ is in the range 5 to 8 mm.

Fixed to and centrally supporting the lens element 10 is a haptic 11 of much larger included area than the lens element 10. Haptic 11 is characterized by a circumferentially continuous periphery 12 and by very substantial fenestration, meaning that the structure is primarily "open", for normal air or "breathing" exposure of the surface of the cornea. Such fenestration may be made in the plastic sheet material of the haptic by photographically delineated milling before or after assembly to or formation with lens element 10, relying upon such chemical-etching, plasma or other milling techniques as are described for intraocular lens haptics, in my U.S. Pat. No. 4,080,709. The outer diameter $D_2$ of haptic 11 is suitably in the range 12 to 16 mm.

It is intended that, although formed from initially flat sheet material, haptic 11 be very compliant in the axial direction, to the extent that it shall be self-conforming to the surface curvature of the cornea upon wetting contact with natural fluid at the surface of the cornea. Such compliance results not only from selection of suitably thin autoclavable sheet plastic material (e.., nylon, high-density polyethylene, Mylar*, Teflon*, polyethersulfone, polyester, sheet silicone, polymethylpentene, polytrichloroethylene, polyvinylidenefluoride, or H.E.M.A., of thickness $T_1$ in the range 0.5 mil to 2 mils), but also from what may be described as a plurality of angularly and radially directed connections between the continuous periphery 12 and the lens element 10.
*Trademarks of the DuPont Company.

More specifically, the haptic 11 of FIG. 1 comprises an integrally interconnected set of radially spaced circular-ring strips 13-14-15-16, of uniform radial width $W_1$, and the inner diameter $D_3$ of the inner ring 16 is less than the lens-element diameter $D_1$, for circumferentially continuous overlap with lens element 10. The spacing S between adjacent rings is preferably at least as great as the radial width $W_1$ of the rings. Radial connecting strips 17 between rings 15-16 of the innermost pair of adjacent rings may be of width $W_2$ equal to $W_1$ and are at equal angular spacing. Radial connecting strips 18 between rings 14-15 of the next pair of adjacent rings are of similar width and angular spacing, but the angular locations of strips 17-18 are in interlaced relation, at angular offset $\delta$ from each other. The pattern of angular interlace of radial-connection strips 17'-18' repeats for interconnection of rings 14, 13 and 12. Finally, as a departure from the symmetry which has been described for the plural angularly and radially directed connections between the peripheral ring 12 and the innermost ring 16, a visually recognizable eccentric lobe or other formation 20 is an integral part of the haptic, at a specific angular location, serving as a reference for the orientation of correction for astigmatism that may be incorporated in the lens element 10.

Prior to application to the cornea, the connection of outer ring 12 to lens element 10 is so axially weak ("floppy") as to be apparently useless as a support for lens element 10. However, once the central lens-bearing region is placed over the pupil, the adjacent floppy haptic regions are drawn, by a self-wetting action akin to surface tension and/or capillary attraction (in the context of surface moisture on the cornea) to lie down on the cornea in conformance to locally adjacent curvature of the cornea. This is not to say that the rings 12 to 16 and their radial connecting strip 17-18 (17'-18') are strictly deformed to the contour of a sphere but rather that they conform generally to such contour. Viewed in close detail each arcuate strip of a ring (e.g., ring 15) between adjacent radial connections 17-18 is subjected to a light twist, with the result that upon blinking the eye, these arcuate strips become slightly deflected or displaced and drawn into circulatory motion, thus reducing the chances of enzyme build-up and enhancing cleansing and lubricating action; also, as a result, essentially all haptic area radially outside the lens element 10 has an affinity for the cornea region to which it has attached itself by self-wetting. And the thin haptic thickness $T_1$ encountered by a blinking eyelid is inconsequential, while the lens element 10 remains sufficinetly anchored to its installed eye-axis position, it being further noted that, as a result of using the indicated milling techniques, all edges of the haptic formations are smoothly rounded and therefore not a source of irritation. The anchoring effect is enhanced by providing a mildly roughened surface (as by etching) on the posterior side of the haptic, and the smoothness of eyelid action is enhanced by providing a smooth anterior surface of the haptic; the roughened surface will have been created prior to milling and will have a dull or matte appearance, and the smooth surface will be shiny, thus enabling ready identification of the front and back surfaces of the assembly, an important factor in conjunction with lobe 20, for assuring correct and easy application of a lens element 10 with correction for the user's astigmatism.

Figure 2:
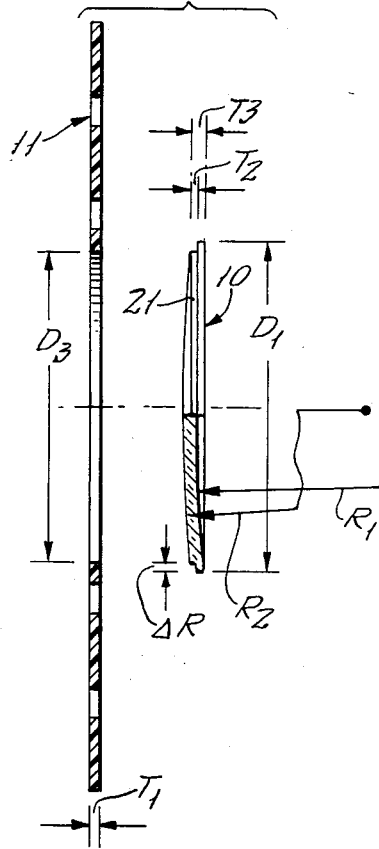
FIG. 2 is an exploded sectional view, taken at 2—2 of FIG. 1, to show the separate lens and haptic components for one embodiment of the structure of FIG. 1.

Referring now to FIG. 2, the configuration of FIG. 1 will be seen to be in application of haptic 11 to a meniscus lens element 10, which may be of molded or otherwise formed transparent plastic but which is shown sectioned for glass, having a concave axial-end surface of first spherical radius $R_1$ and a convex outer or opposite-end surface of second spherical radius $R_2$, thus defining a positive meniscus lens element 10; however, the relation of $R_1$ to $R_2$, and whether and how a cylindrical curvature is incorporated into one of the surfaces of lens element 10 will be understood to be dictated by prescription appropriate to the optical correction needed by a particular eye. The circular periphery of element 10 in FIG. 2 is characterized by a rabbet formation 21, which may be etched, thus establishing a substantially cylindrical land of diameter substantially matching the diameter $D_3$ of the central opening of haptic 11. The axial depth $T_2$ of the rabbet may be about 0.05 mm, thus constituting a relatively harmless incursion upon the rim thickness $T_3$ of the lens element. Further discussion of haptic-to-rabbet fit, bonding, retention and other considerations will be found in my pending patent application Ser. No. 225,349, filed Jan. 15, 1981, and therefore need not be repeated here. Most importantly, it will be understood that the sectional view of components 10-11 in FIG. 2 is grossly exaggerated, merely to enable feature recognition.

Figure 3:
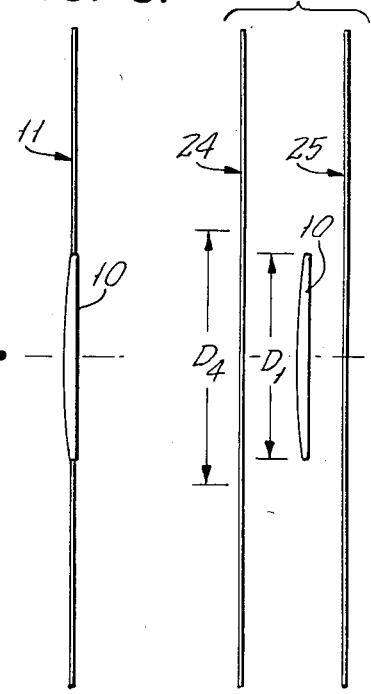
FIGS. 3, 4 and 5 are simplified views similar to FIG. 2, to illustrate further embodiments.
Figure 4:
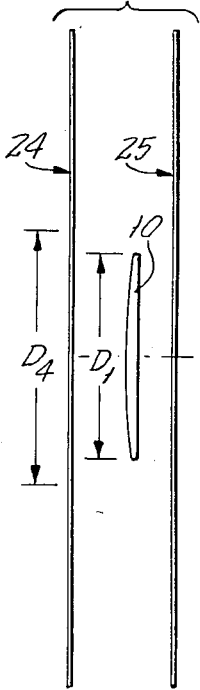
Figure 5:
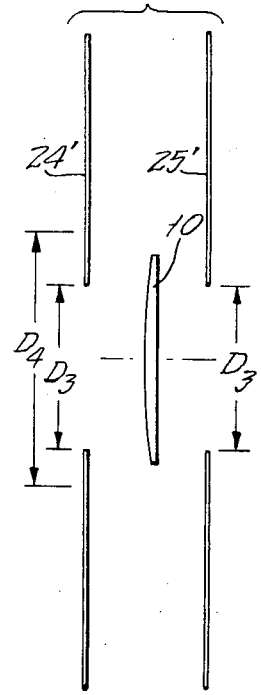

FIGS. 3, 4 and 5 illustrate various other embodiments which may utilize the general haptic and lens relationship of FIG. 1. A finished product having the general sectional appearance of FIG. 3 may be the product of bonding two haptic blanks 24-25 to each other and to opposite sides of the lens element 10, with the rings 12 to 16 and connections 17-18 (17'-18') of blanks 24-25 in exact register; in FIG. 4, this relation is shown for the case of haptic blanks 24-25 which are of clear plastic and which have no central opening (i.e., in which diameter $D_3$ is not measurable), and in FIG. 5 this relation is shown for the case of haptic blanks 24'-25' which do have the central opening of diameter $D_3$. FIGS. 4 and 5 also serve to illustrate the case in which only one of the haptic blanks, e.g., blank 25 (25') is characterized by the described angularly and radially directed connections, the other blank 24 (24') being characterized by an outer diameter $D_4$, equal to $D_3+2W_1$, to enable bonded anchorage of at least the inner-ring (16) region of the two blanks to each other, with circumferential continuity around the outer edge of lens element 10; in the FIG. 4 situation, the $D_4$-limited blank 24 is therefore purely circular, and in the FIG. 5 situation the $D_4$-limited blank 24' is a circular annulus.

Still further, FIGS. 4 and 5 will be understood to illustrate combinations in which only one of the blanks 24 (25') is assembled to the lens element 10, as by non-toxic bonding at overlap with one axial end of the lens element 10.

Still further, the finished-product sectional appearance of FIG. 3 will be understood to represent an embodiment wherein lens element 10 and haptic 11 are the product of selective milling (or etching) and compressional deformation (a) from a single sheet of suitable plastic sheet material, using for example techniques described in my copending patent application Ser. No. 288,217, filed July 29, 1981, now U.S. Pat. No. 4,402,579, or (b) from a composite laminate of more than one sheet of one or more plastic materials, as disclosed in my copending patent application Ser. No. 319,622, filed Nov. 9, 1981, now U.S. Pat. No. 4,450,593.

Figure 6:
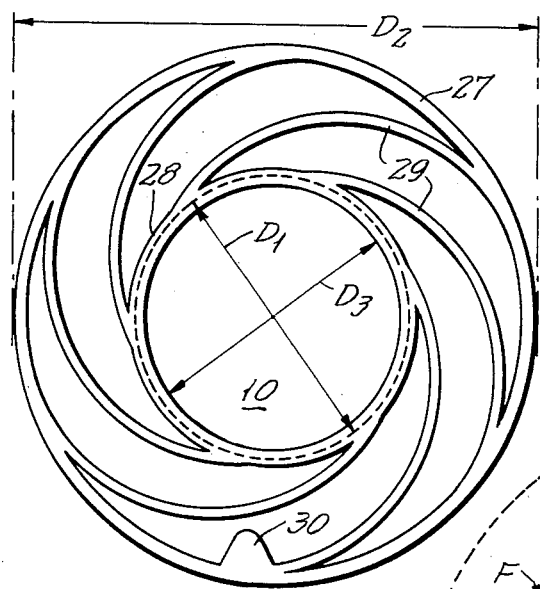
FIGS. 6, 7 and 8 are views similar to FIG. 1, to show other haptic configurations.

In the alternative fenestrated configuration of FIG. 6, a peripherally continuous outer-ring component 27 is integrally united to a circular inner-ring component 28 by way of plural angularly and radially directed connections in the form of radially expanding spiral strips 29 which progress in the same angular direction with respect to the optical axis of lens element 10, and a single integrally formed local lobe 30 eccentric to the central axis provides a visually recognizable reference for the purposes described for lobe 20 of FIG. 1. Peripheral integrity is assured via ring 27, with utmost axial compliance, to conform to cornea curvature.

Figure 7:
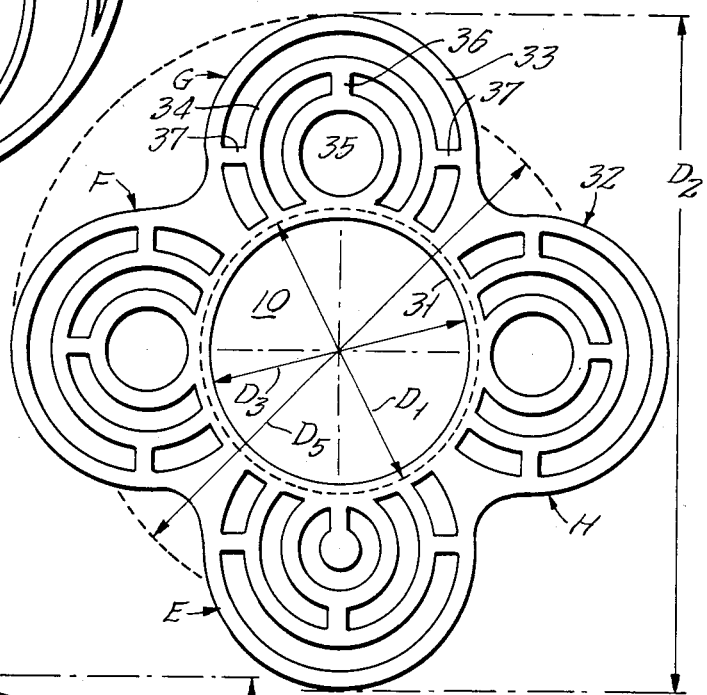

In the further illustrative fenestrated haptic configuration of FIG. 7, a peripherally continuous outer-ring component 32 radially undulates as a function of angle about inner ring 31 (i.e., about the optical axis), and the undulation is about a mean diameter $D_5$, less than $D_2$ but at substantial offset from the perimeter of lens element 10. The number of undulations is at least three, but a preferred number of four is shown, to characterize the component 32 with an outward circular bow at each of four locations E, F, G, H. Taking bow G as illustrative, the pattern of plural angularly and radially directed connections will be seen to follow the technique of FIG. 1, in that plural concentric rings or ring segments 33-34-35 are interconnected by radial-strip connections 36-37 in angularly interlaced relation, the inner ring 35 of arcuate bow 33 being tangentially related to the inner ring 31 of the haptic, and the outer ring segments 33-34 terminating at integral juncture with the inner ring 31 of the haptic. A single local lobe 38 integrally formed within the inner ring of bow E enables the visual recognition of orientation, as discussed for lobe 20 in connection with FIG. 1.

Figure 8:
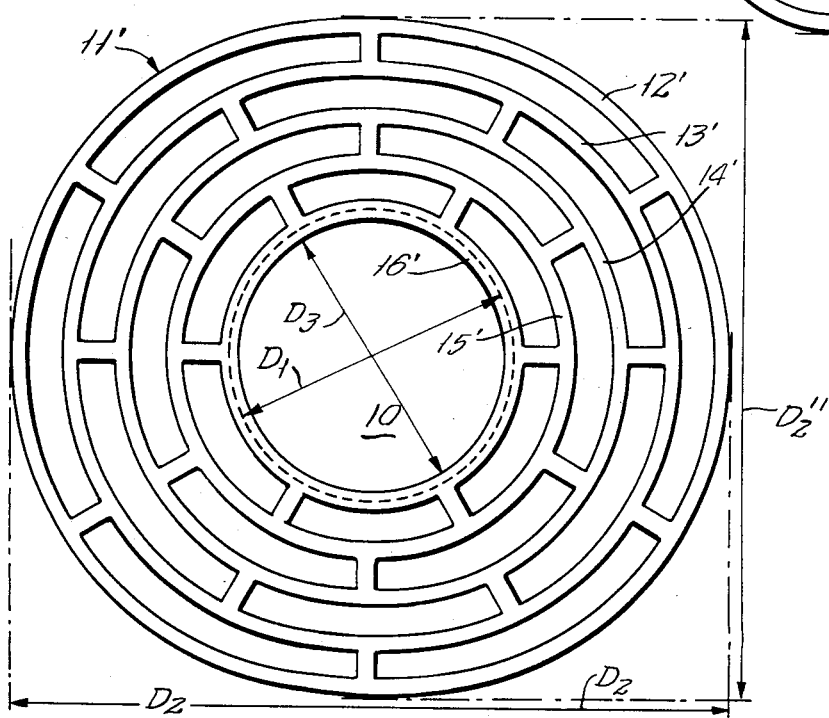

FIG. 8 will be recognized for its similarity to FIG. 1, except that the peripherally continuous outer ring 12' of the haptic (11') is generally elliptical, with a major-axis span $D_2'$ and minor-axis span $D_2''$ which typically may be 14 mm and 12 mm, respectively. The inner ring 16' is circular, and spaced intervening rings 15'-14'-13' may be progressively more elliptical. The overall appearance enables ready recognition of major-axis orientation, so that if one side is of matte-finish and the other shiny, there can be no ambiguity of interpretation for orientation of astigmatic correction via lens 10. A lobe 20 is thus not needed in the FIG. 8 configuration.

The haptic configurations of FIGS. 6, 7 and 8 will be understood to be applicable to the variety of lens-combined relationships discussed for the configuration of FIG. 1. In every case (FIGS. 1, 6, 7 and 8), circumferential integrity is preserved, in the context of extreme axial compliance, and without need to permanently deform the haptic component into any particular shape; in other words, from its initially flat state, the haptic is in all cases self-adapting to the curvature of the cornea to which it is applied, and the self-adapting action is aided by the radially-compliant nature of connection to the peripherally continuous outer ring of the haptic.

While the invention has been described in detail for specific illustrative embodiments, it will be understood that modifications may be made without departing from the scope of the invention.

What is claimed is:

1. A contact-lens assembly adapted for removable mounting to the cornea of an eye, comprising a circular lens element, and haptic means peripherally connected to said lens element, said haptic means including an integrally formed axially compliant fenestrated annulus having an outer perimeter which is circumferentially continuous, said annulus having plural angularly and radially directed connections between said perimeter and said lens element.

2. The assembly of claim 1, in which said perimeter is circular about the axis of said lens element.

3. The assembly of claim 1, in which said perimeter radially undulates as a function of angular progression about the axis of said lens element.

4. The assembly of claim 1, in which said angularly and radially directed connections comprise a plurality of like spiral strips radially expanding in the same direction of rotation about the axis of said lens element.

5. The assembly of claim 1, in which said angularly and radially directed connections comprise a plurality of radially spaced circumferentially continuous annular strips with first angularly spaced radial connections between a first pair of radially adjacent annular strips, and with second angularly spaced radial connections between another pair of radially adjacent annular strips, said first and said second radial connections being in angularly interlaced relation about the axis of said lens element.

6. The assembly of claim 5, in which a single circumferentially continuous annular strip is common to said first and second pairs.

7. The assembly of claim 5, in which said outer perimeter is one of the annular strips of one of said pairs.

8. The assembly of claim 3, in which the number of cycles of undulation is at least three.

9. The assembly of claim 3, in which the undulating perimeter includes plural angularly spaced outwardly bowed arcuate formations each of which is generally arcuate about a center that is radially offset from the axis of said lens element, said angularly and radially directed connections being for each of said bowed arcuate formations and about the center of the involved arcuate formation.

10. The assembly of claim 9, in which the center of each bowed arcuate formation is outward of the periphery of said lens element.

11. The assembly of claim 10, in which the innermost of said angularly and radially directed connections is an annulus tangent to the periphery of said lens element with a radially outward connection diametrically opposite the point of tangency.

12. The assembly of claim 1, in which said lens element and said haptic means are separate parts with bonded connection at the periphery of said lens element.

13. The assembly of claim 12, in which said haptic means comprises two parts having bonded connection to each other and in retaining relation with opposite axial sides of the periphery of said lens element.

14. The assembly of claim 1, in which said lens element and haptic means are integrally formed from the same piece of plastic material.

15. The assembly of claim 1, in which said haptic means has a central opening with a rim engaged to said lens element.

16. The assembly of claim 13, in which the two parts of said haptic means are identical and in register with each other.

17. The assembly of claim 13, in which one to the exclusion of the other of the two parts of said haptic means includes said compliant annulus and said perimeter, the other of said parts being an annulus essentially limited to radial overlap with the peripheral edge of said lens element and with a radially adjacent inner region of said one part.

18. The assembly of claim 14, in which the single piece of plastic material is sheet material, said lens element being a compressed deformation in the sheet material.

19. The assembly of claim 1, in which the fenestration of said annulus includes a visually recognizable formation eccentric to the axis of said lens element, and in which said lens element is characterized for astigmatic correction at a predetermined angle with respect to said visually recognizable formation.

20. A contact-lens adapted for self-adherent removable mounting to the cornea of an eye, comprising a circular lens element, and haptic means peripherally connected to said lens element, said haptic means being of fenestrated sheet material and integrally including a circumferentially continuous outer perimeter having radially and axially compliant connections to said lens element, said connections being of such compliant action as to deform in continuous smooth conformance to the surface curvature of the cornea and to adhere thereto solely through contact with natural moisture of the surface of the cornea.

21. A contact-lens assembly according to claim 1 or claim 20, in which said perimeter is generally elliptical.

22. A contact-lens assembly according to claim 1 or claim 20, in which one side of said haptic means is of matte finish and the other side is of shiny finish.

* * * * *